United States Patent
Huang et al.

(10) Patent No.: US 7,134,043 B2
(45) Date of Patent: Nov. 7, 2006

(54) DVD EDC CHECK SYSTEM AND METHOD WITHOUT DESCRAMBLING SECTOR DATA

(75) Inventors: Wei-Hung Huang, Hsin Chu (TW); Li-Lien Lin, Hsin Chu (TW)

(73) Assignee: Media Tek Inc., Hsin Chu (TW)

( * ) Notice: Subject to any disclaimer, the term of this patent is extended or adjusted under 35 U.S.C. 154(b) by 610 days.

(21) Appl. No.: 10/394,056

(22) Filed: Mar. 24, 2003

(65) Prior Publication Data

US 2005/0102602 A1 May 12, 2005

(30) Foreign Application Priority Data

Mar. 25, 2002 (TW) ................ 091105841

(51) Int. Cl.
*G06F 11/00* (2006.01)
(52) U.S. Cl. .............. 714/5; 714/5; 714/42; 714/44
(58) Field of Classification Search ............. 713/187; 714/784
See application file for complete search history.

(56) References Cited

U.S. PATENT DOCUMENTS 6,029,186 A * 2/2000 DesJardins et al. ......... 708/492
6,119,259 A 9/2000 Jeong
6,751,771 B1 * 6/2004 Chuang et al. ............. 714/784

* cited by examiner

*Primary Examiner*—Robert Beausoliel
*Assistant Examiner*—Matthew Urick
(74) *Attorney, Agent, or Firm*—Birch, Stewart, Kolasch, & Birch, LLP

(57) ABSTRACT

A check system and method for checking EDC of a DVD sector without prior descrambling the sector. In the EDC check method, after the sector is received, a check value corresponding to a sector identification (ID) of the sector is generated. Meanwhile, an EDC value of the sector is calculated directly without prior descrambling the sector. Finally, the EDC value and the check value are compared. If the EDC value equals to the check value, a sector-correct signal is outputted; otherwise, a sector-error signal is outputted. Because the EDC check method and system of the invention skip the prior data descrambling step, the processing speed can be improved and the hardware resources may be more-efficiently used.

4 Claims, 5 Drawing Sheets

| ID(7,4) | initial value | check value NewSum |
|---|---|---|
| 0H | 0001H | 466F002EH |
| 1H | 5500H | 9ABFA60H |
| 2H | 0002H | 8CDE005H |
| 3H | 2A00H | B57F4C0FH |
| 4H | 0004H | 99BC00A9H |
| 5H | 5400H | EAFE980FH |
| 6H | 0008H | B3780143H |
| 7H | 2800H | 55FD300FH |
| 8H | 0010H | E6F00297H |
| 9H | 5000H | ABFA601EH |
| 0AH | 0020H | 4DE0053FH |
| 0BH | 2001H | D7F4C02DH |
| 0CH | 0040H | 9BC00A7EH |
| 0DH | 4002H | 2FE9804BH |
| 0EH | 0080H | B78014EDH |
| 0FH | 0005H | DFD30087H |

DVD EDC CHECK SYSTEM AND METHOD WITHOUT DESCRAMBLING SECTOR DATA

This nonprovisional application claims priority under 35 U.S.C. § 119(a) on patent application Ser. No(s). 091105841 filed in TAIWAN, R.O.C. on Mar. 25, 2002, which is(are) herein incorporated by reference.

BACKGROUND OF THE INVENTION

1. Field of the Invention

The invention relates generally to a DVD data processing system and method, and more particularly to a DVD EDC (Error Detection Code) check system and method in which the EDC check of a sector may be performed without prior descrambling the sector.

2. Description of the Related Art

DVD (Digital Versatile Disk) disk is a newly developed medium to record data. The DVD disk with single side and single layer can store up to 4.7 GB (Giga Bytes) of data, which is about seven times of data possibly stored in a CD disk. Compared to the CD disk, the DVD disk has higher storage capacity by storing data in smaller pits along narrower tracks. Also, by using a more sophisticated sector encoding technology, the DVD disk has higher capacity than the CD disk. The data format and data encoding technology of the DVD disk are different from and more complex than those of the CD disk. Thus, the data processing and error detecting operations are also different when reproducing data stored in the DVD disk.

Please refer to FIG. 1, which shows a conventional DVD data processing system for reproducing data stored in the DVD disk. The DVD data processing system includes an optical pickup 12, a digital converter 14, a sync code detector and 8/16 demodulator 16, a DVD sector decoder 18, a buffer memory 20, a host interface 24 and a host interface bus 22. The optical pickup 12 reads data by irradiating light to the DVD disk 10 and senses the variation of the reflected light on the disc surface. Then, the digital converter 14 generates a channel bit stream of amplified and digitized waveform. Next, the sync code detector and 8/16 demodulator 16 detects a sync and demodulates the channel bit stream, and converts the channel bit stream into a plurality of sectors. The sectors are then transferred to the DVD sector decoder 18 for error correction (by error correction code ECC), descrambling, and error detection (by error detection code EDC). In addition, a buffer memory 20 is provided for storing temporary data generated during the operation. If the error correction and error detection are successfully performed and there's no error found in the sector, the sector will be descrambled and transferred to the host interface bus 22 such as an IDE bus through the host interface 24.

Both the CD disk and the DVD disk are general-purpose data storage media. The CD disk may use different formats for storing data, depending on whether audio, video, or other types of data is to be stored, while the DVD disk uses only one format to store data. FIG. 2 illustrates the format of a DVD sector without ECC parity information. It is noted that since ECC is not directly related to the present invention and is well known in the art, the ECC operation will not be described for the sake of brevity. As shown in FIG. 2, each DVD sector includes four bytes of ID (sector identification), two bytes of IED (ID Error Detection), six bytes of CPR_MAI (Copyright Management Information), 2,048 bytes of main data, and four bytes of EDC (error correction code). The four-byte ID (sector identification) indicates the logical sector address of the DVD sector. The ID (sector identification) and the IED (Identification data Error Detection) together can be used to form a (6, 4) Reed-Solomon code, which can be decoded to detect and correct the error(s) in the ID. The six-byte CPR_MAI (Copyright Management Information) are reserved for copyright protection. The four-byte EDC is calculated using checksum, cyclic redundancy check (CRC) codes or the like. The EDC will be added to the 2,060 bytes of ID, IED, CPR_MAI and main data. The calculation of the EDC is described in the following. Assuming that the MSB of the first byte of ID is $b_{16511}$ and the LSB of the last byte of EDC is $b_0$, the four-byte EDC is chosen so as to make the polynomial I(x) be exactly divided by the check polynomial g(x), as shown below.

$$I(x)=b_{16511}x^{16511}+b_{16510}x^{16510}+\ldots+b_2x^2+b_1x+b_0g$$
$$(x)=x^{32}+x^{31}+x^4+1 \qquad (1)$$

It is noted that the check polynomial g(x) in the DVD format is different from the EDC check polynomial in the CD format.

When data are recorded onto the DVD disk, the EDC is calculated and then added to the ID, IED, CPR-MAI, main data, and form a sector. Then the main data is scrambled. In other words, the EDC is calculated based on the un-scrambled main data. Therefore, in the conventional art when data are read from the DVD disk, the sector data is prior descrambled, and then the EDC check is performed. In general, the method for decoding the sector includes the procedures of descrambling the main data, then calculating and checking the EDC. FIG. 3 shows a conventional DVD data decoding procedure. As shown in FIG. 3, when the decoder receives the sector, the 2048 bytes of main data are prior descrambled. Thereafter, the EDC check unit performs the EDC calculation and check the 2064 bytes of data in the sector. If the calculated EDC value equals to zero, it indicates that the sector does not have errors and a sector-correct signal is generated. If the calculated EDC value does not equal to zero, it indicates the sector has errors and a sector-error signal is generated.

In the conventional art as shown in FIG. 3, the descrambling procedure is performed only for the purpose of the EDC calculation and check process. Therefore, at this stage the descrambled data is not used for other purposes. For example, in the conventional art, at this stage the descrambled data is not transferred to the host interface bus. Therefore, if the EDC calculation and check processes for the sector can be performed directly without the prior descrambling procedure, the processing speed in the decoding process may be improved, and the hardware resources may be more-efficiently used.

SUMMARY OF THE INVENTION

In view of the above-mentioned problems, an object of the invention is to provide an DVD data processing system and method which performs the EDC check without prior descrambling the sector. It is also an object of the present invention to provide an EDC check system and method which directly performs the EDC calculation and check processes for the sector without prior descrambling the sector.

To achieve the above-mentioned objects, the DVD data processing method includes the following steps. First, a DVD sector is received, and a check value corresponding to the sector identification (ID) of the received sector is provided. Meanwhile, an EDC value of the sector is calculated without prior descrambling the sector. Finally, the EDC value and the check value are compared. If the EDC value equals to the check value, a sector-correct signal is generated; otherwise, a sector-error signal is generated.

To achieve the above-mentioned object, the DVD data processing system includes a sector receiving and analyzing unit for receiving the sector, an EDC calculating unit for calculating an EDC value of the sector, a check value generating unit for generating a check value corresponding to the sector identification (ID) of the received sector, and a comparing unit for comparing the EDC to the check value, outputting a sector-correct signal if the EDC equals to the check value, and outputting a sector-error signal if the EDC does not equal to the check value.

Since the DVD data processing system and method checks the EDC of a received sector without prior descrambling the sector, the processing speed in the decoding process may be improved and the hardware resources may be more-efficiently used.

DETAILED DESCRIPTION OF THE invention

Figure 1:
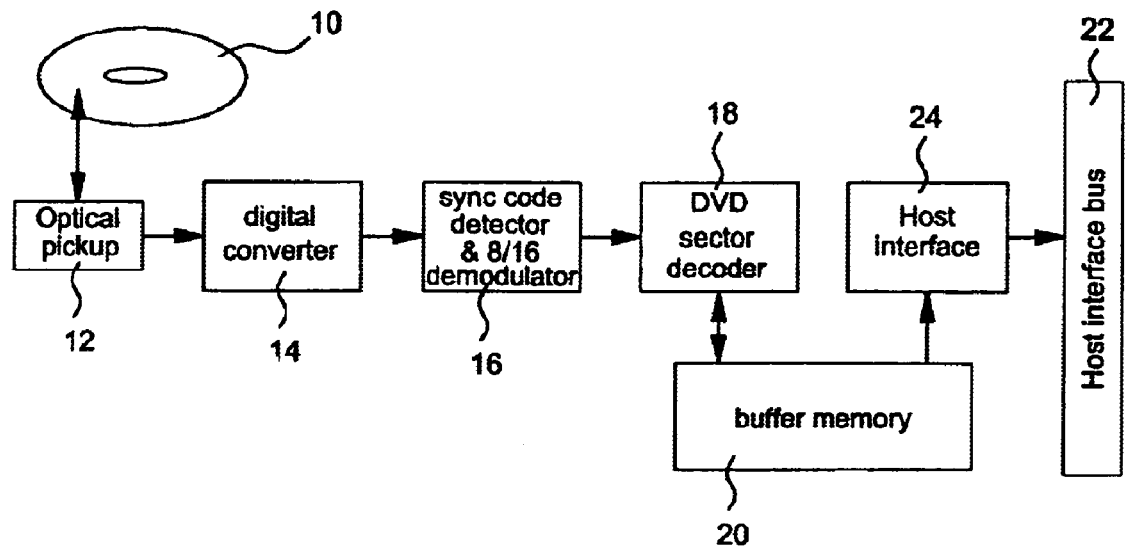
FIG. 1 shows a conventional DVD data processing system.
Figure 2:
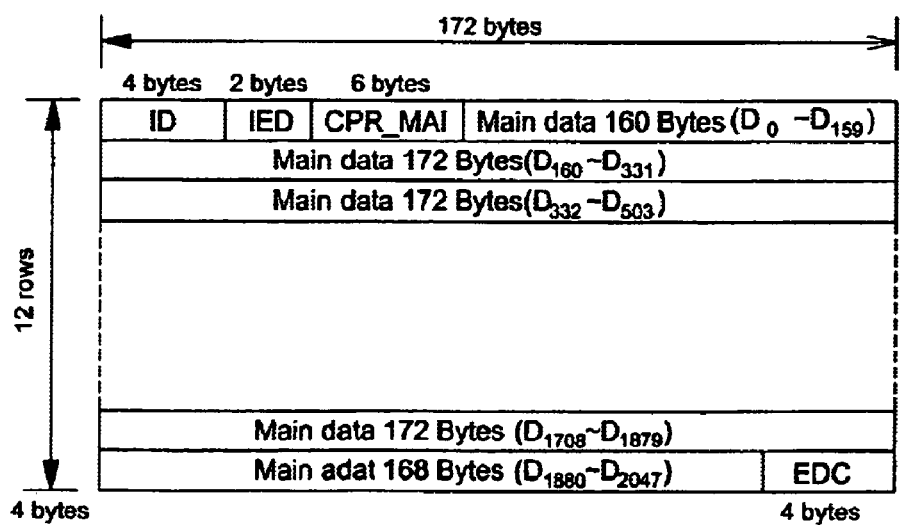
FIG. 2 shows the format of a DVD sector.
Figure 3:
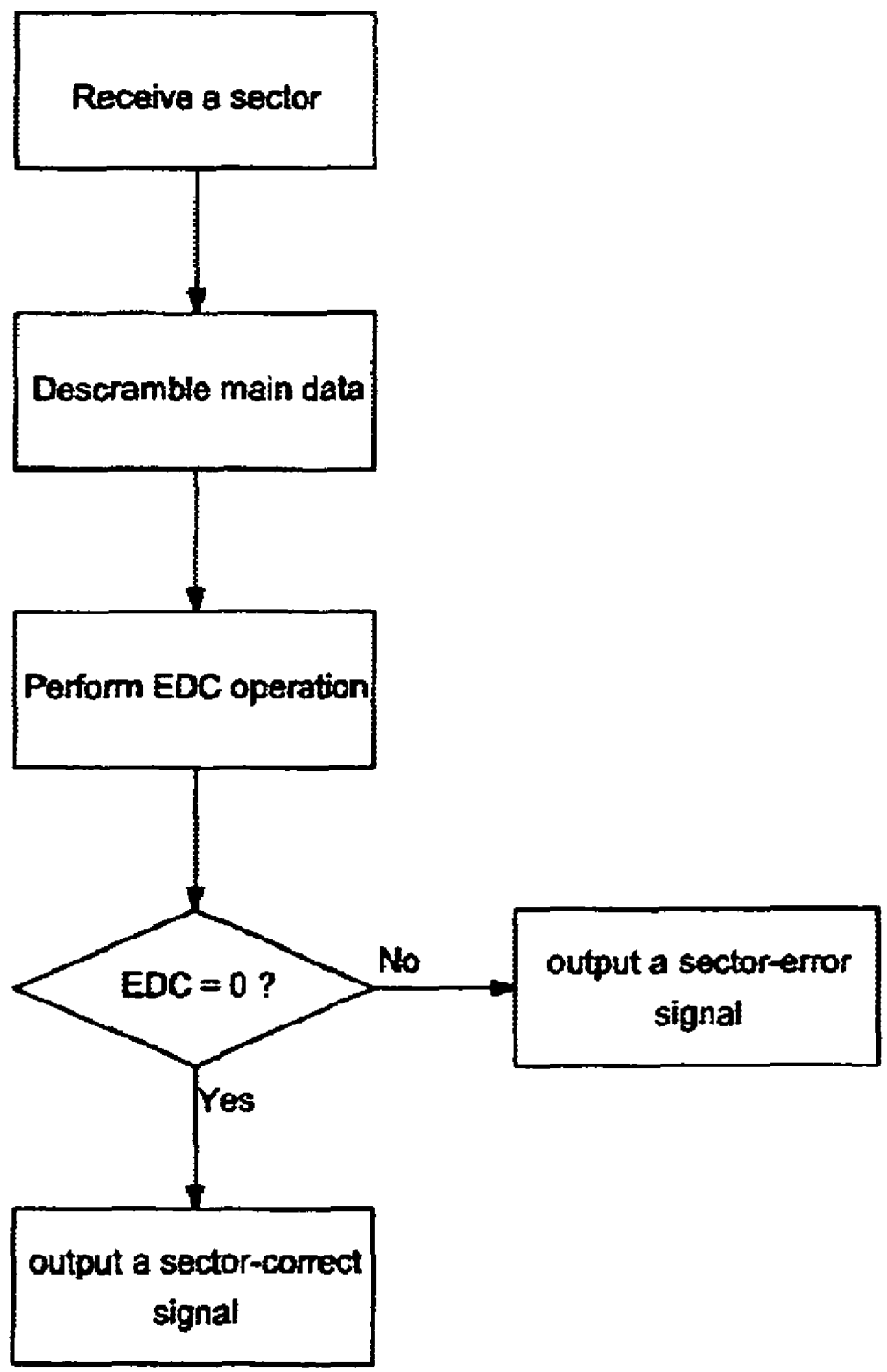
FIG. 3 shows the flow chart of an EDC check method in a conventional DVD data processing procedure.

The DVD EDC check system and method of the invention will be described in detail with reference to the accompanying drawings.

First, the data of each DVD sector can be expressed by the following polynomials (2), (3), and (4).

$$A(x) + S(x) + EDC(x) \qquad (2)$$

$$A(x) = ID(x) + IED(x) + CPR\_MAI(X) \qquad (3)$$

$$EDC(x) = \sum_{i=31}^{0} b_i x^i = I(x) \bmod\{g(x)\} \qquad (4)$$

where ID(x) is a polynomial for the ID (sector identification), IDE(x) is a polynomial for the IED (ID Error Detection), CPR_MAI(x) is a polynomial for the CPR_MAI (copyright management information), S(x) is a polynomial for the main data, and EDC(x) is a polynomial for the EDC (error detection codes). The I(x) and g(x) can be expressed by the polynomials (5) and (6).

$$I(x) = A(x) + S(x) = \sum_{i=16511}^{32} b_i x^i \qquad (5)$$

-continued
$$g(x) = x^{32} + x^{31} + x^4 + 1 \qquad (6)$$

If the received DVD sector is error-free, the following equation (7) should be true.

$$[A(x)+S(x)+EDC(x)]\bmod[g(x)]=0 \qquad (7)$$

Assuming that the scrambled main data D'(x) equals to D(x)+S(x), and then the check value NewSum obtained by EDC calculating the un-descrambled data can be expressed as:

$$NewSum = \{A(x) + [D(x) + S(x)] + EDC(x)\}\bmod[g(x)] \qquad (8)$$
$$= \{A(x) + S(x) + EDC(x)\}\bmod[g(x)] +$$
$$[D(x)]\bmod[g(x)]$$

It can be seen from Equation (8) that if the received sector is error-free, the value obtained by EDC calculating the un-descrambled data should be [D(x)]mod[g(x)], i.e., check value NewSum=[D(x)]mod[g(x)]. Thus, as long as the value of [D(x)]mod[g(x)] of a known un-descrambled error-free sector can be obtained in advance, it is possible to directly perform the EDC check on an un-descrambled sector, and the prior descrambling process for the un-descrambled sector can be omitted accordingly.

Figures 4, 5:
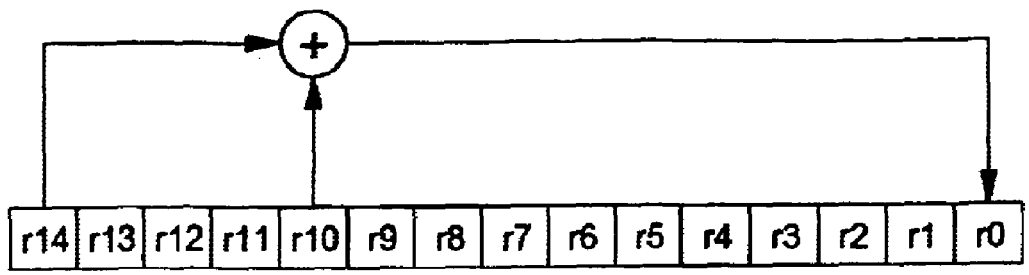
FIG. 4 shows the operation of scrambling the DVD sector using a feedback shift register.
FIG. 5 shows a table of the check values NewSum calculated corresponding to sixteen possible values of the 4th to 7th bits of the ID (sector identification).

The way for obtaining the check value NewSum for the un-descrambled sector data will be described in the following. In the method for scrambling the DVD data, a feedback shift register is used to perform the scrambling operation. FIG. 4 shows the operation of scrambling the DVD sector using a feedback shift register. The initial values of the shift register are determined by the values of the 4th to 7th bits of the sector identification (ID) in a sector, and are defined within the specification of the DVD format. Hence, in the preferred embodiment the [D(x)]mod[g(x)] corresponding to sixteen possible values of the 4th to 7th bits of the sector identification (ID) in a sector is obtained and stored in a look-up table. Then, the value of [D(x)]mod[g(x)] is retrieved from the look-up table and compared to the calculated EDC value performed on an un-descrambled sector, and then whether the un-descrambled sector is error-free can be determined. That is, if the calculated EDC value of the un-descrambled sector equals to the NewSum (which is the [D(x)]mod[g(x)] of a known error-free un-descrambled sector), the received sector is error-free; otherwise, the received sector includes one or more errors.

FIG. 5 shows a look-up table of the check values NewSum (i.e., [D(x)]mod[g(x)]) corresponding to different possible values of the 4th to 7th bits of the sector identification (ID). The check values NewSum is the EDC value to be obtained when performing EDC calculation on an error-free un-descrambled sector. In the preferred embodiment, the method for obtaining each of the check value NewSum in the look-up table of FIG. 5 includes selecting an appropriate initial value according to each possible value of the $4^{th}$ to $7^{th}$ bits of the sector identification (ID) of a known error-free sector, substituting the selected initial value into the feedback shift register of FIG. 4 and scrambling the main data of the error-free sector, obtaining the EDC value of the error-free scrambled sector, and then the obtained EDC value is filled into the look-up table as the check value NewSum.

Since the 4th to 7th bits of the sector identification (ID) may be anyone of the sixteen possible values, the sixteen corresponding check values NewSum can be calculated in advance and stored in the look-up table of FIG. 5 for later retrieval. By using the look-up table, it is possible to check whether a received sector is error-free even when the sector is not prior descrambled. Since the method for calculating the EDC value of a received sector is well known to people skilled in the art, detailed description thereof is omitted.

Figure 6:
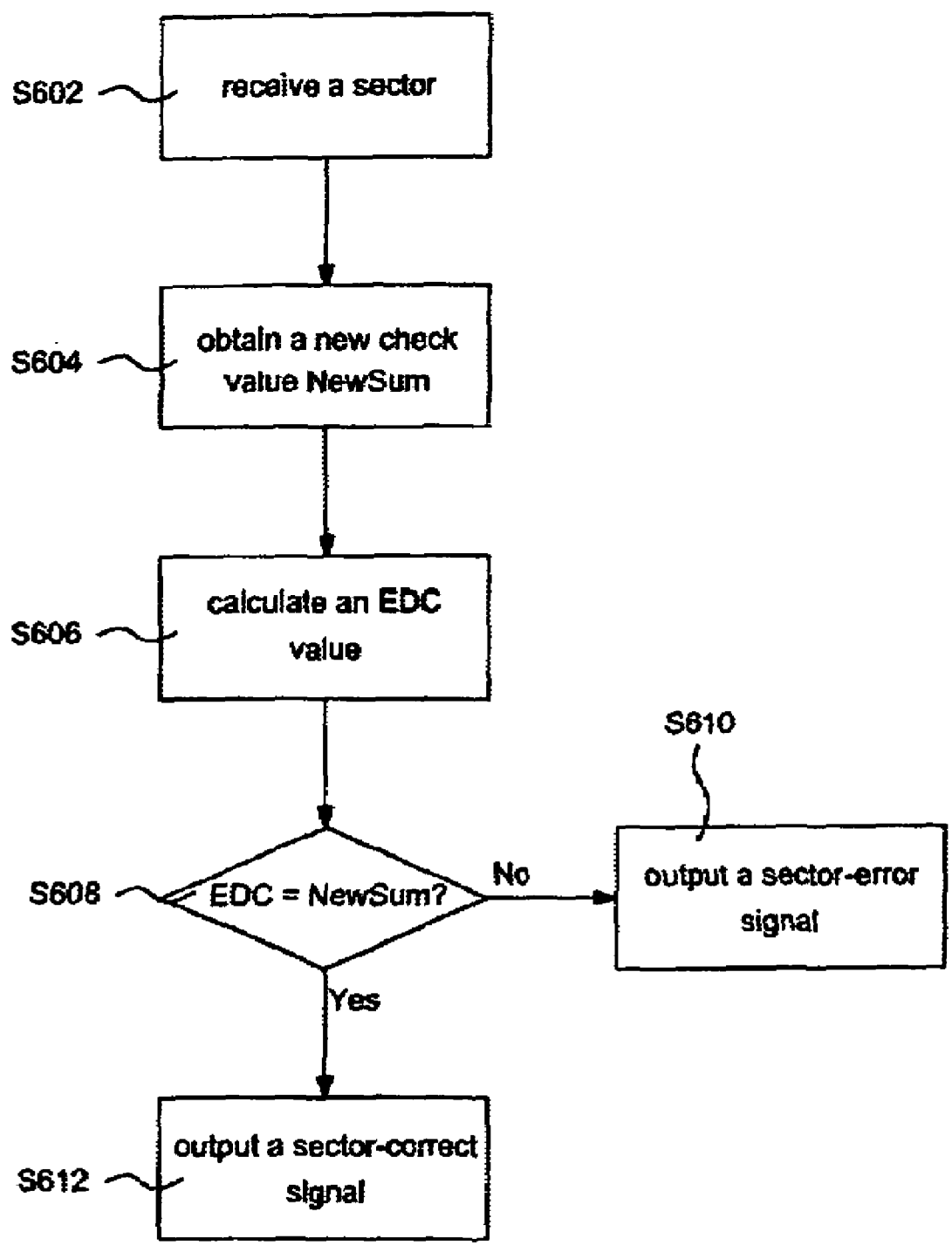
FIG. 6 shows a flow chart of the EDC check method in a DVD data processing procedure according to one preferred embodiment of the invention.

FIG. 6 shows a flow chart of the EDC check method in the DVD data decoding procedure according to the preferred embodiment. As shown in FIG. 6, the sector is not prior descrambled in the EDC check method in the data decoding procedure. In this embodiment, the method includes the following steps.

Step S602: receive a sector.

Step S604: obtain a check value NewSum. More specifically, a check value NewSum is obtained corresponding to the values of the 4th to 7th bits of the sector identification (ID) of the received sector. The check value NewSum may be previously stored in a memory in the format of a look-up table, and is retrieved in this step.

Step S606: calculate an EDC value of the received un-descrambled sector. The EDC value of the sector may be calculated by an EDC calculating unit.

Step S608: compare the EDC value with the check value NewSum. If the EDC value does not equal to the check value NewSum, the received sector includes one or more errors and the process proceeds to step S610; otherwise, the process proceeds to step S612.

Step S610: output a sector-error signal.

Step S612: output a sector-correct signal.

Figure 7:
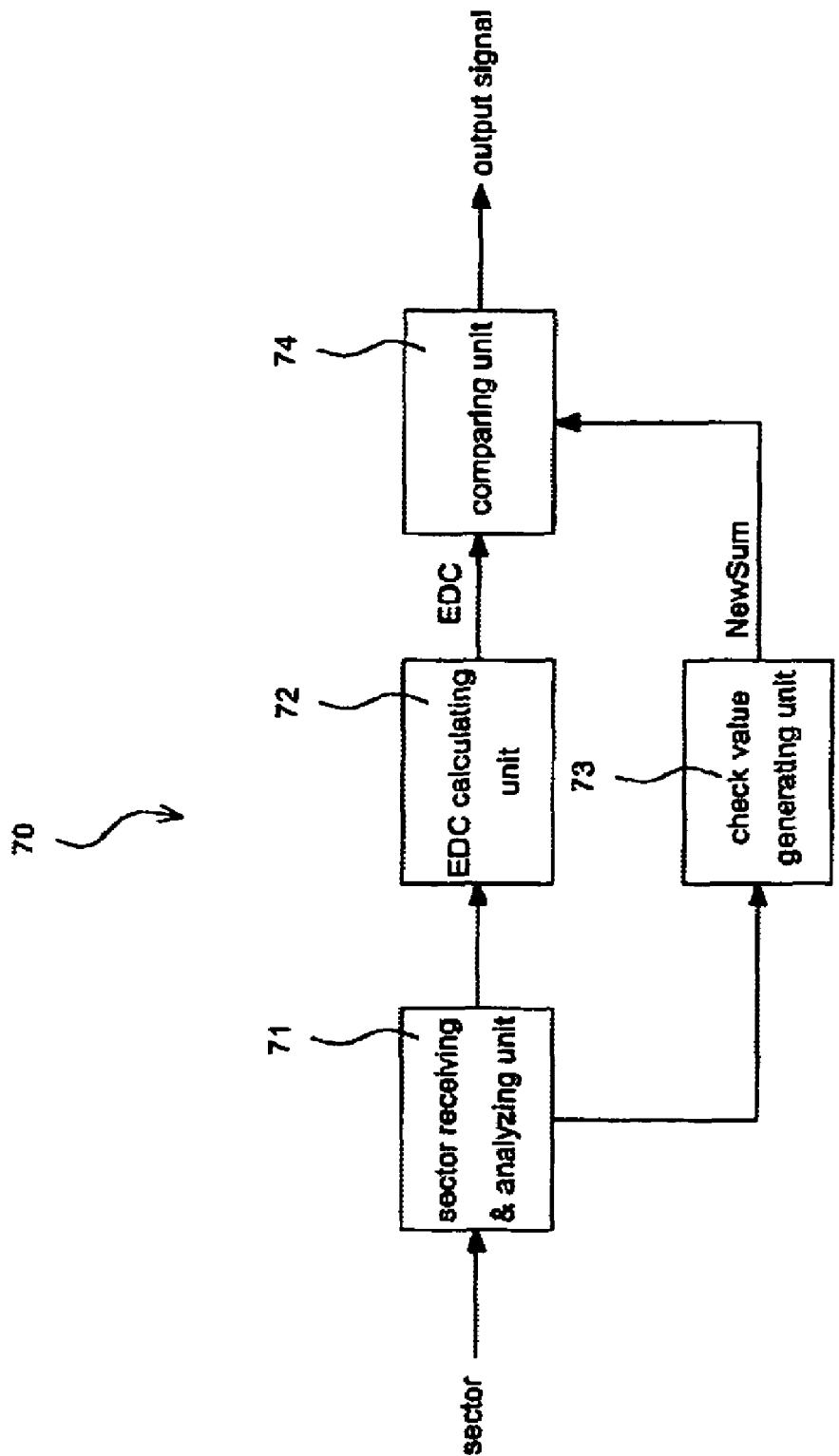
FIG. 7 shows a block diagram of an EDC check system in the DVD data processing system according to the preferred embodiment of the invention.

FIG. 7 shows a block diagram of an EDC check system in a DVD data processing system according to the preferred embodiment. The EDC check system may be included in the DVD sector decoder 18 as shown in FIG. 1. Referring to FIG. 7, the EDC check system 70 includes a sector receiving and analyzing unit 71, an EDC calculating unit 72, a check value generating unit 73, and a comparing unit 74. The sector receiving and analyzing unit 71 receives a DVD sector, analyzes the sector identification (ID) of the sector, and outputs the 4th to 7th bits of the sector identification (ID) to the check value generating unit 73. The EDC calculating unit 72 receives the sector and directly calculates the EDC value of the sector without prior descrambling the sector. The check value generating unit 73 receives the 4th to 7th bits of the sector identification (ID), and generates a check value NewSum by a look-up table or by other calculating methods. The comparing unit 74 receives the EDC value and the check value NewSum and compares the EDC value with the check value NewSum If the EDC value equals to the check value NewSum, the comparing unit 74 outputs a sector-correct signal; otherwise, it outputs a sector-error signal.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A method for performing EDC (error detection code) check on a sector, the sector includes an ID (sector identification) and main data, the method comprising the steps of:
    retrieving a check value corresponding to the ID of the sector from a look-up table according to values of the ID;
    calculating an EDC value of the sector without prior descrambling the main data of the sector;
    comparing the EDC value with the check value so as to determine whether the sector has errors; and
    outputting a sector-correct signal if the EDC value equals to the check value, and outputting a sector-error signal if the EDC value does not equal to the check value;
    wherein the check values stored in the look-up table are generated by performing EDC check on a known error-free scrambled sector.

2. The method of claim 1, wherein the check value is retrieved from the look-up table according to values of 4th to 7th bits of the ID.

3. The method of claim 1, wherein each of the check values is generated by substituting initial values of a feedback shift register according to values of the 4th to 7th bits of the ID and scrambling the main data of the known error-free sector, and performing EDC check on the known error-free scrambled sector.

4. A system for performing EDC check on a sector, the sector includes an ID (sector identification) and main data, the system comprising:
    an EDC calculating unit for calculating an EDC value of the sector directly without prior descrambling the main data of the sector;
    a look-up table for storing check values, wherein the check values are generated by performing EDC check on a known error-free scrambled sector; and
    a comparing unit for comparing the EDC value with one of the check value in the look-up table so as to determine whether the sector has errors, outputting a sector-correct signal if the EDC value equals to the check value, and outputting a sector-error signal if the EDC value does not equal to the check value, wherein the check value is retrieved from the look-up table according to values of the ID.

* * * * *